(12) United States Patent
Yamada et al.

(10) Patent No.: US 8,080,631 B2
(45) Date of Patent: Dec. 20, 2011

(54) SILOXANE-MODIFIED HYPERBRANCHED POLYIMIDE

(75) Inventors: Yasuharu Yamada, Nagoya (JP); Jun Sakai, Nagoya (JP)

(73) Assignee: National University Corporation Nagoya Institute of Technology, Nagoya-Shi (JP)

( * ) Notice: Subject to any disclaimer, the term of this patent is extended or adjusted under 35 U.S.C. 154(b) by 0 days.

(21) Appl. No.: 11/782,191

(22) Filed: Jul. 24, 2007

(65) Prior Publication Data

US 2007/0270562 A1    Nov. 22, 2007

Related U.S. Application Data

(63) Continuation of application No. PCT/JP2006/301579, filed on Jan. 31, 2006.

(30) Foreign Application Priority Data

Feb. 1, 2005 (JP) ................................. 2005-024692

(51) Int. Cl.
    *C08G 73/10* (2006.01)
(52) U.S. Cl. ............. 528/353; 528/26; 528/33; 528/310
(58) Field of Classification Search .................. 528/353, 528/310, 26, 33
    See application file for complete search history.

(56) References Cited

U.S. PATENT DOCUMENTS

| 3,325,450 | A | 6/1967 | Holub |
| 3,740,305 | A | 6/1973 | Hoback et al. |
| 4,705,540 | A | 11/1987 | Hayes |
| 6,262,223 | B1 * | 7/2001 | Meador et al. ................. 528/353 |
| 6,599,675 | B2 * | 7/2003 | Kamada et al. ............. 430/270.1 |
| 2002/0040068 | A1 | 4/2002 | Yamaguchi et al. |
| 2003/0064235 | A1 * | 4/2003 | Okawa et al. ............. 428/473.5 |
| 2006/0001700 | A1 * | 1/2006 | Bertelsen et al. ................ 347/50 |

FOREIGN PATENT DOCUMENTS

| JP | 62-223228 A1 | 10/1987 |
| JP | 02-091124 A1 | 3/1990 |
| JP | 03-069922 A1 | 3/1991 |
| JP | 06-308503 A1 | 11/1994 |
| JP | 11-286547 A1 | 10/1999 |
| JP | 2000-080272 A1 | 3/2000 |
| JP | 2000-191780 A1 | 7/2000 |
| JP | 2001-270945 A1 | 10/2001 |
| JP | 2002-012688 A1 | 1/2002 |
| JP | 2002-060488 * | 2/2002 |
| JP | 2002-060488 A1 | 2/2002 |
| JP | 2003-038942 A1 | 2/2003 |
| KR | 2001-0076640 A1 | 8/2001 |

OTHER PUBLICATIONS

Suzuki et al Gas transport of 6FDA-TAPOB hyperbranched polyimide membrane, Polymer, vol. 45 (2004), 7167-7171.*

Yasuharu Yamada et al., "Property of Silicon-Containing Polyimide, and Application Thereof," Polymer Processing, Kobunshi Kankokai, Feb. 1997, vol. 46, No. 2, pp. 2-11.

J.E. McGrath et al., "Synthesis and Characterization of Segmented Polyimide-Polyorganosiloxane Copolymers," Advances in Polymer Science, 1999, vol. 140, pp. 61-105.

Fang, Jianhua, et al. "Hyperbranched Polyimides for Gas Seperation Applications. 1. Synthesis and Characterization," Macromolecules 2000, 33, pp. 4639-4646.

* cited by examiner

*Primary Examiner* — James J Seidleck
*Assistant Examiner* — Gregory Listvoyb
(74) *Attorney, Agent, or Firm* — Burr & Brown

(57) ABSTRACT

It is an object of the present invention to provide a siloxane-modified hyperbranched polyimide which has more excellent electric properties (low dielectric property), gas permeability, mechanical properties (low modulus), surface properties (adhesiveness) and the like while maintaining thermal stability, mechanical strength, chemical resistance and processability and the like intrinsic to polyimide and which may be variously functionalized and can be utilized advantageously in industrial applications. A siloxane structure represented by the following structural formula (1) is introduced into a three-dimensional structured hyperbranched polyimide molecule.

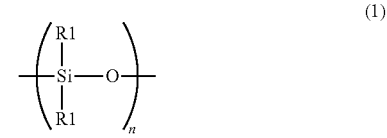

(wherein R1 represents a hydrocarbon group having from 1 to 6 carbon atoms, and n indicates an integer of from 1 to 50).

3 Claims, 4 Drawing Sheets

1,3,5-triamino benzene

Group A

| tris(3-aminophenyl)amine |
| tris(4-aminophenyl)amine |
| tris(3-aminophenyl)benzene |
| tris(4-aminophenyl)benzene | tris(4-aminophenyl)benzene

Group B

| 1,3,5-tris(3-aminophenoxy)benzene |
| 1,3,5-tris(4-aminophenoxy)benzene |
| 1,3,5-tris(4-aminophenoxy)triazine |

1,3,5-tris(4-aminophenoxy)benzene

X : triamine residue

Z : acid anhydride residue

A : functional end group

X: triamine residue

Z: acid anhydride residue

A: functionl end group m1, m2, m3: positive integer

X : triamine desidue

Z : acid anhydride residue

A : functional end group

SILOXANE-MODIFIED HYPERBRANCHED POLYIMIDE

This application is a continuation of the International Application No. PCT/JP2006/301579 filed Jan. 31, 2006, which claims the benefit under 35 U.S.C. §119(a)-(d) of Japanese Patent Application 2005-024692, filed Feb. 1, 2005, the entireties of which are incorporated herein by reference.

TECHNICAL FIELD

The present invention relates to a siloxane-modified hyperbranched polyimide, in particular, to a siloxane-modified hyperbranched polyimide favorably usable as a material for insulation films and interlayers for microelectronic applications, gas separation membranes, heat-resistant adhesives, and the like.

BACKGROUND ART

Polyimide has various excellent properties such as thermal, mechanical and electric properties, chemical resistance, gas separation properties and processability, therefore polyimide is industrially and widely utilized as a high performance material for microelectronic materials, molding materials, films, etc. The polyimides used as such conventional high performance materials have been linear polyimides which are generally obtained by reacting: an aromatic tetracarboxylic dianhydrides such as pyromellitic dianhydride or biphenyltetracarboxylic dianhydride, and an aromatic diamines such as diaminodiphenyl ether.

On the other hand, a silicon resin (silicone) is also excellent in thermal stability, electric properties, chemical resistance and surface properties (hydrophobicity, adhesive property), and is used in various applications as industrial materials.

Heretofore, various siloxane-modified polyimides having silicon atoms and various siloxane structures in the molecule thereof have been developed as materials having both excellent properties of polyimide and silicon. For example, a siloxane-modified polyimide having a lower modulus than polyimide and excellent in thermoplasticity, adhesive property is widely used for films for microelectronic materials, heat-resistant adhesives, and etc.

Various methods are proposed for introducing various siloxane structures in a polyimide molecule, and of those, a method of copolymerization with a diaminosiloxane compound at the time of synthesis of polyimide is a typical method (see Non-Patent Document 1 and Patent Document 1). Using this method, there are also reported a polyimide copolymer having a micro-separated structure (see Patent Document 2 and Non-Patent Document 2) and a siloxane-containing polyimide soluble in organic solvent (see Patent Documents 3 and 4), obtained by reacting an aromatic tetracarboxylic dianhydride, an aromatic diamine and a diaminosiloxane compound.

However, in such conventional siloxane-containing polyimides, the constitutive polyimide is linear, and the linear polyimide basically has only two end groups when any specific structure such as graft is not introduced thereinto. Therefore, the conventional siloxane-containing polyimides comprising such a linear polyimide are difficult to modify with various functional groups and to produce multifunctional polymers having various functions.

Patent Document 1: JP-A-62-223228
Patent Document 2: JP-A-2-91124
Patent Document 3: U.S. Pat. No. 3,325,450
Patent Document 4: U.S. Pat. No. 3,740,305
Non-Patent Document 1: J. E. McGrath et al., Advances in Polymer Science, Vol. 140, p. 61
Non-Patent Document 2: Yamada, Yasuharu, and two others, "Property of Silicon-Containing Polyimide, and Application Thereof", monthly Polymer Processing, published by Kobunshi Kankokai, February 1997, Vol. 46, No. 2, pp. 2-11

DISCLOSURE OF THE INVENTION

Problems to be Solved by the Invention

The present invention has been made in the light of the situations discussed above. It is therefore an object of the present invention to provide a polyimide having better electric properties (low dielectric property), gas permeability and surface properties as compared with the conventional linear polyimides and siloxane-modified linear polyimides, while maintaining heat resistance, mechanical strength, chemical resistance and processability which polyimides have inherently and the polyimide can be readily modified with various functional groups inside the molecule and at the molecular ends, therefore the polyimide can obtain various functions by such modification.

Means for Solving the Problems

The present inventors have conducted intensive studies and researches in an effort to solve the above-mentioned problems. The present inventors have synthesized a siloxane-modified hyperbranched polyimide which comprises a hyperbranched polyimide having a dendritic structure which contains numerous molecular ends within one molecule (see FIG. 1) and which has a prescribed siloxane structure in a molecule, and have found that the siloxane-modified hyperbranched polyimide has remarkably excellent electric properties and gas permeability as compared with the conventional linear polyimides and siloxane-modified linear polyimides, and further, it enables creation of various high performance materials.

Specifically, the invention was made based on the above findings, and an object of the present invention is to provide a siloxane-modified hyperbranched polyimide having a three-dimensional structure and having a siloxane structure represented by the following structural formula (1) in a molecule thereof, which has a dendritic structure and is obtained through imidization of a siloxane-modified hyperbranched polyamic acid obtained by reacting an aromatic tetracarboxylic dianhydride, an aromatic triamine and a siloxane-containing compound represented by the following structural formula (2). "Siloxane structure" as referred to in the following of this description means the structure represented by the following structural formula (1).

[Chemical Formula 1]

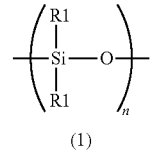

(1)

(wherein R1 represents a hydrocarbon group having from 1 to 6 carbon atoms, and n indicates an integer of from 1 to 50).

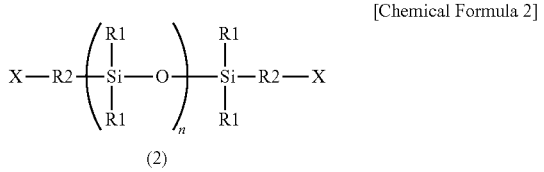

(2)

(wherein R1 represents a hydrocarbon group having from 1 to 6 carbon atoms; R2 represents a divalent organic group; X represents an amino group, a carboxylic acid group, a halide carboxylate group or a carboxylic anhydride group; and n indicates an integer of from 1 to 50).

The object of the invention also includes a siloxane-modified hyperbranched polyimide having a three-dimensional structure and having a siloxane structure represented by the above-mentioned structural formula (1) in a molecule thereof, which has a dendritic structure and is obtained through imidization of a siloxane-modified hyperbranched polyamic acid obtained by reacting a reaction product of an aromatic tetracarboxylic dianhydride with a diaminosiloxane compound represented by the following structural formula (3), and an aromatic triamine.

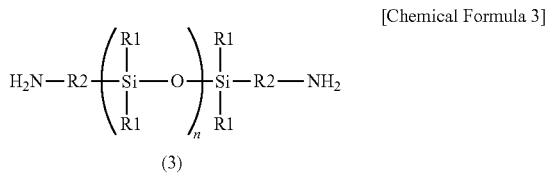

(3)

(wherein R1 represents a hydrocarbon group having from 1 to 6 carbon atoms; R2 represents a divalent organic group; and n indicates an integer of from 1 to 50).

The object of the invention also includes a siloxane-modified hyperbranched polyimide having a three-dimensional structure and having a siloxane structure represented by the above-mentioned structural formula (1) in a molecule thereof, which has a dendritic structure and is obtained through imidization of a siloxane-modified hyperbranched polyamic acid obtained by reacting a hyperbranched polyamic acid which is a reaction product of an aromatic tetracarboxylic dianhydride with an aromatic triamine and has an acid anhydride end and/or an amine terminal, with a siloxane-containing compound represented by the following structural formula (2).

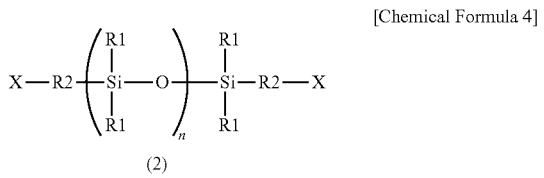

(2)

(wherein R1 represents a hydrocarbon group having from 1 to 6 carbon atoms; R2 represents a divalent organic group; X represents an amino group, a carboxylic acid group, a halide carboxylate group or a carboxylic anhydride group; and n indicates an integer of from 1 to 50).

In one preferred embodiment of the siloxane-modified hyperbranched polyimide according to the present invention mentioned above, the aromatic triamine is at least one of tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris (4-aminophenoxy)benzene (TAPOB), 1,3,5-tris(4-aminophenoxy) triazine. Another preferred embodiment of the siloxane-modified hyperbranched polyimide of the present invention is one having many reactive end groups thereof, wherein at least a part of the end groups (including a case of all end groups— the same shall apply hereinunder) is modified through reaction with any of 1) amines, carboxylic acids, halide carboxylates or carboxylic anhydrides, and 2) fluorine-containing compounds of amines, carboxylic acids, halide carboxylates or carboxylic anhydrides.

Further, the present invention also provides an insulation film for microelectronic materials, a gas separation membrane and a heat-resistant adhesive comprising the siloxane-modified hyperbranched polyimide of any of the above-mentioned embodiments.

Advantageous Effect of the Invention

The siloxane-modified hyperbranched polyimide according to the present invention is obtained by introducing a prescribed siloxane structure like a silicon resin (silicone), into a molecule of a hyperbranched polyimide capable of exhibiting the same heat resistance, mechanical strength and chemical resistance as those of linear polyimides. Therefore, it has remarkably excellent electric properties (low dielectric property), gas permeability, and surface properties as compared with the conventional siloxane-modified linear polyimides. In addition, its modulus is lowered as compared with that of hyperbranched polyimides without siloxane modification, because it has a siloxane structure.

The siloxane-modified hyperbranched polyimide of the present invention which is obtained through modification by reacting reactive end groups (amino group, acid anhydride group) thereof with various compounds may advantageously have other excellent properties in addition to the above-mentioned properties. Concretely, a siloxane-modified hyperbranched polyimide obtained through modification with a fluorine-containing compound of an amine, a carboxylic acid, a halide carboxylate or a carboxylic anhydride on at least a part of the reactive end groups (amino group, acid anhydride group) have a remarkably low dielectric constant.

Accordingly, the insulation film for microelectronic materials, the gas separation membrane and the heat-resistant adhesive that comprise the siloxane-modified hyperbranched polyimide of the present invention having such excellent properties, also exhibit excellent properties. In addition thereto, the polyimide advantageously can be utilized as industrial coating materials (paints), and the like.

BEST MODE FOR CARRYING OUT THE INVENTION

Figure 1:
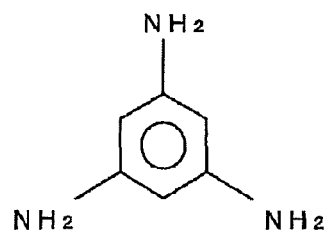
FIG. 1 is an explanatory schematic view showing a structure of hyperbranched polyimide.
Figure 1:
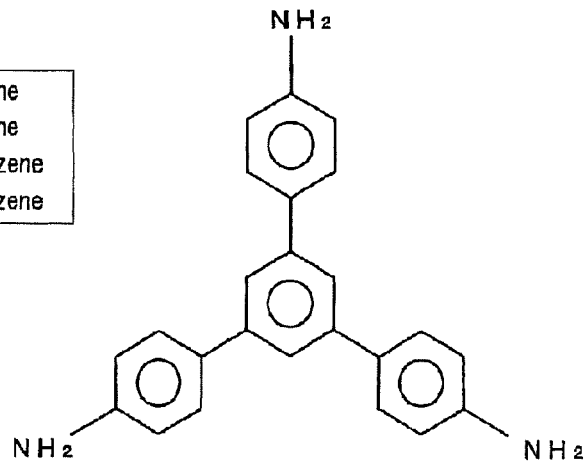
Figure 1:
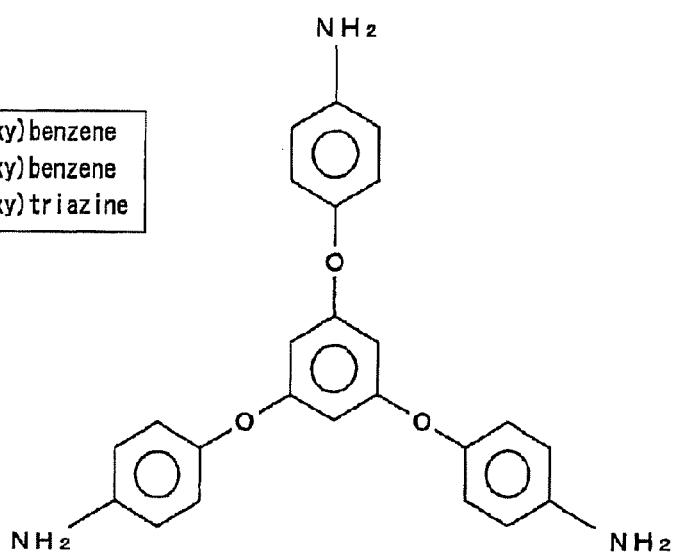
Figure 2:
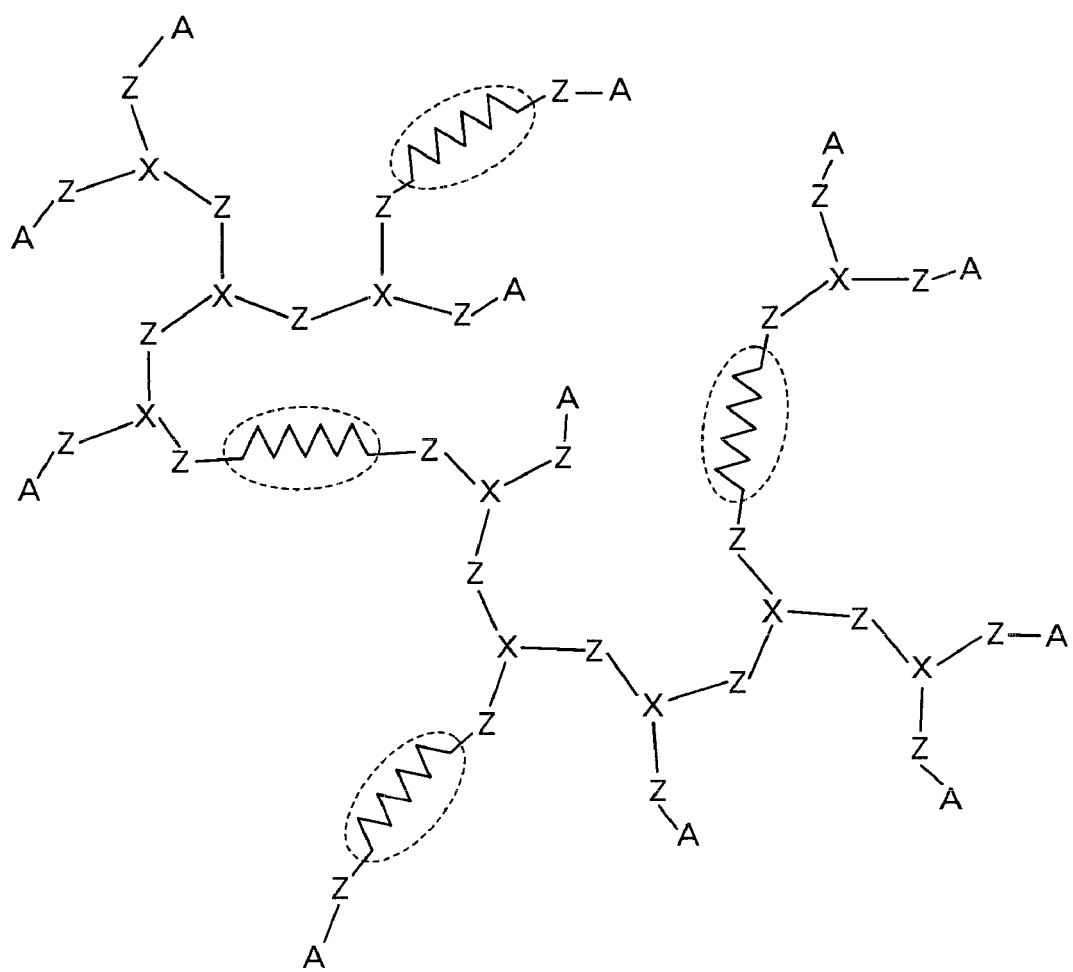
FIG. 2 is an explanatory schematic view showing one example of a chemical structure of siloxane-modified hyperbranched polyimide according to the present invention.
Figure 3:
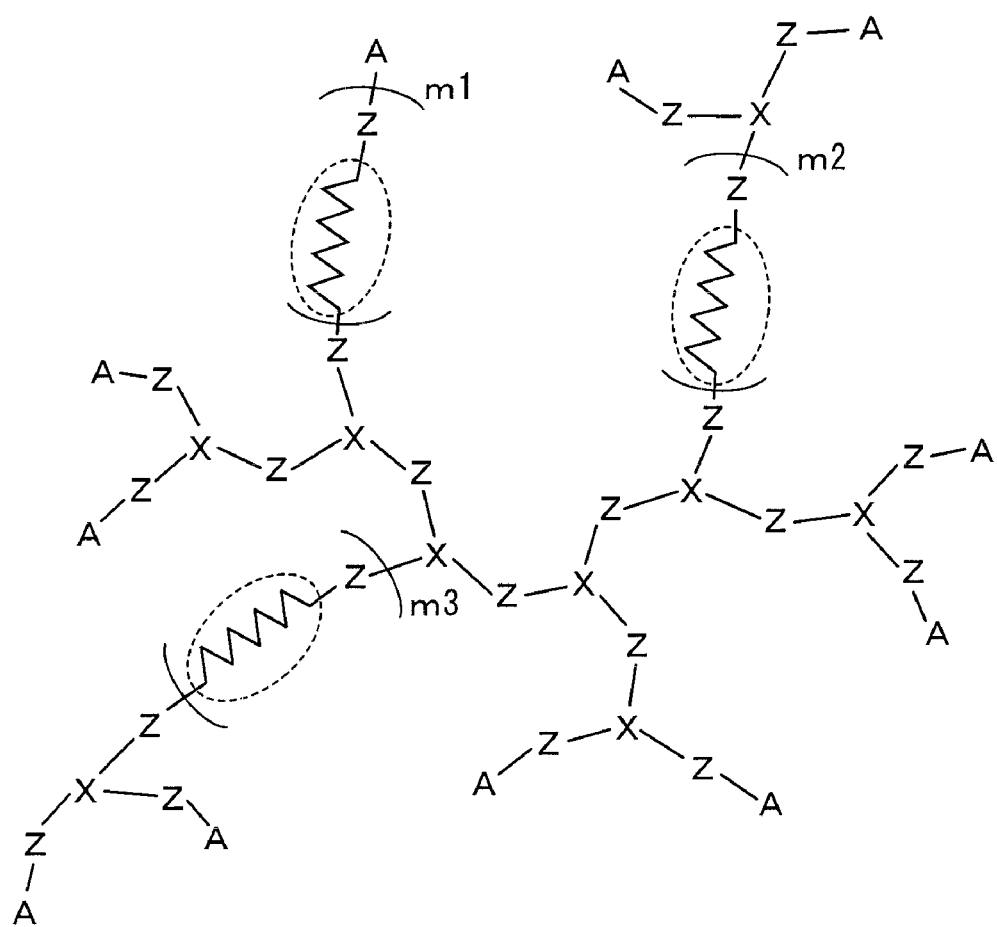
FIG. 3 is an explanatory schematic view showing another example of a chemical structure of siloxane-modified hyperbranched polyimide according to the present invention.
Figure 4:
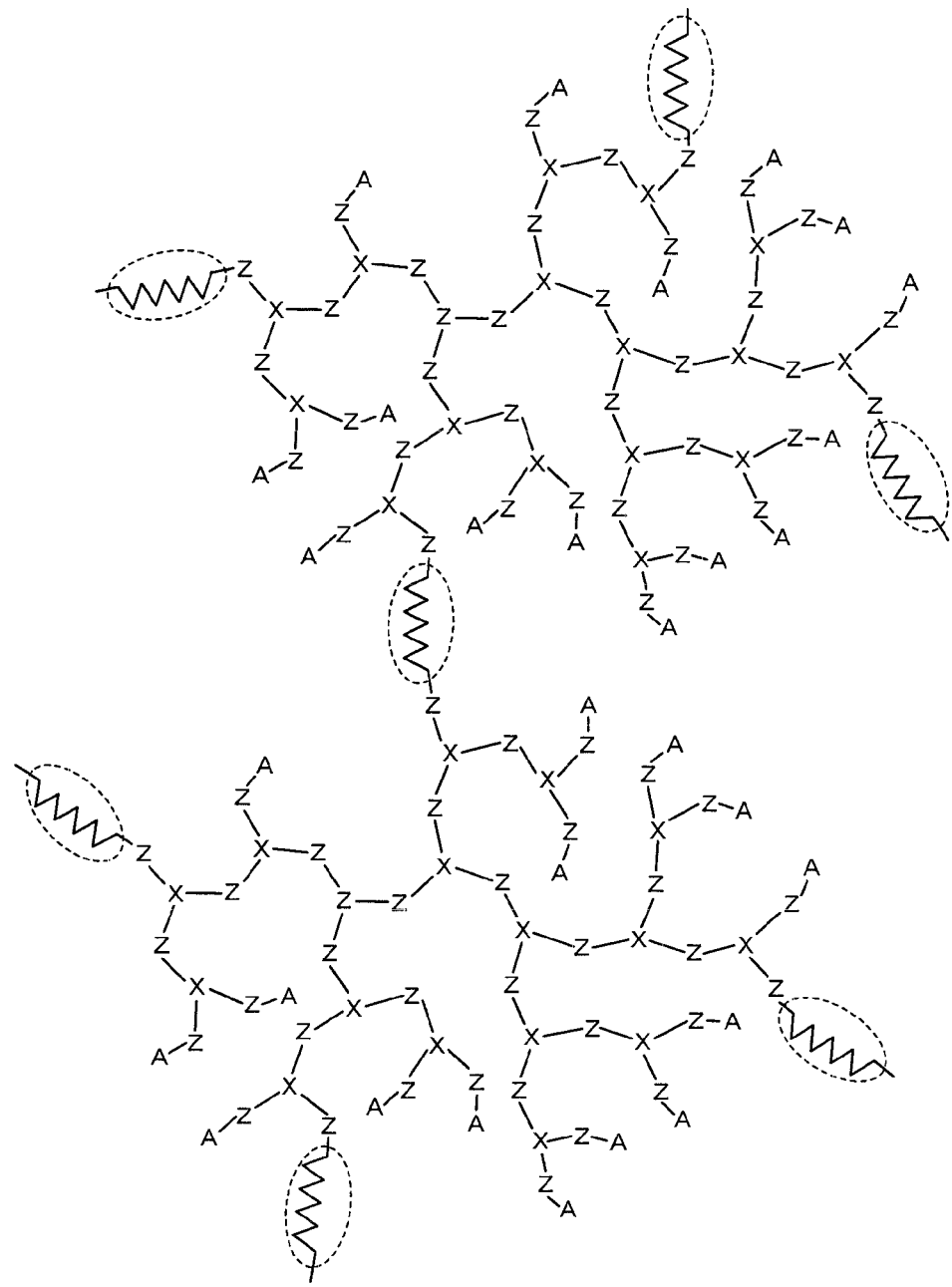
FIG. 4 is an explanatory schematic view showing still another example of a chemical structure of a siloxane-modified hyperbranched polyimide according to the present invention.

The siloxane-modified hyperbranched polyimide according to the present invention has a chemical structure as shown in FIG. 2 through FIG. 4. Specifically, as apparent from FIG. 2 through FIG. 4, in each siloxane-modified hyperbranched polyimide molecule schematically shown in each drawing, each hyperbranched polyimide moiety is bonded to each other by siloxane moiety (parts surrounded by the dotted line in FIG. 2 through FIG. 4) having a siloxane structure represented by the following structural formula (1) (this may be hereinafter referred to simply as siloxane structure), thereby constituting one molecule.

[Chemical Formula 5]

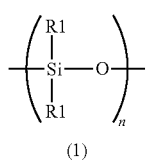

(1)

(wherein R1 represents a hydrocarbon group having from 1 to 6 carbon atoms; and n indicates an integer of from 1 to 50).

The siloxane-modified hyperbranched polyimides of the present invention, having the chemical structure shown in FIG. 2 through FIG. 4, all may be advantageously produced, using an aromatic tetracarboxylic dianhydride, an aromatic triamine and a siloxane-containing compound represented by the following structural formula (2) (this may be hereinafter referred to simply as siloxane-containing compound) as starting materials.

[Chemical Formula 6]

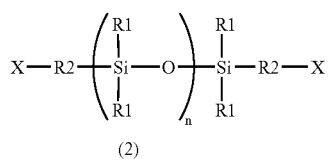

(2)

(wherein R1 represents a hydrocarbon group having from 1 to 6 carbon atoms; R2 represents a divalent organic group; X represents an amino group, a carboxylic acid group, a halide carboxylate group or a carboxylic anhydride group; and n indicates an integer of from 1 to 50).

As the aromatic tetracarboxylic dianhydride and the aromatic triamine for use in the present invention, any of conventionally known various ones may be used. Among such known ones, one kind or more than one kinds is/are suitably selected and used, corresponding to an intended siloxane-modified hyperbranched polyimide.

Concretely, examples of the aromatic tetracarboxylic dianhydride include compounds such as pyromellitic dianhydride (PMDA), oxydiphthalic dianhydride (ODPA), 3,3',4,4'-benzophenone tetracarboxylic dianhydride (BTDA), 3,3',4,4'-diphenylsulfone tetracarboxylic dianhydride (DSDA), 4,4'-(hexafluoroisopropylidene) diphthalic dianhydride (6FDA), 2,2'-bis[(dicarboxyphenoxy)phenyl]propane dianhydride (BSAA).

Further, examples of the aromatic triamine include aromatic compounds each including three amino groups in a molecule, such as, 1,3,5-triamino benzene, tris (3-aminophenyl)amine, tris(4-aminophenyl) amine, tris (3-aminophenyl) benzene, tris(4-aminophenyl)benzene, 1,3,5-tris(3-aminophenoxy)benzene, 1,3,5-tris(4-aminophenoxy)benzene (TAPOB), 1,3,5-tris(4-aminophenoxy)triazine.

In addition, derivatives of the above-mentioned aromatic tetracarboxylic dianhydride and aromatic triamine, each having, on a benzene ring thereof, a substituent such as a hydrocarbon group (e.g., an alkyl group, a phenyl group, a cycloalkyl group), a hydroxyl group, a halogen group, an alkoxy group, an acetyl group and a sulfonic group, may also be used in the present invention. Please note that the aromatic triamine may be referred to, hereafter, as an amine compound, in a generic term.

In producing the siloxane-modified hyperbranched polyimide according to the present invention, the aromatic tetracarboxylic dianhydride and the amine compound are used at a reaction mole ratio, ([aromatic tetracarboxylic dianhydride]/[amine compound]), falling within a mole ratio range of from 1.0:0.1 to 1.0:1.5, preferably from 1.0:0.3 to 1.0:1.2.

On the other hand, the siloxane-containing compound to be used along with the above-mentioned aromatic tetracarboxylic dianhydride and amine compound is represented by the following structural formula (2), and is concretely a diaminosiloxane compound, a siloxane-containing carboxylic halide, a siloxane-containing carboxylic acid, and a siloxane-containing carboxylic anhydride. Among the siloxane-containing compounds having the structure, a diaminosiloxane compound of the following structural formula (2) wherein X is an amino group (the following structural formula (3)—this may be hereinafter referred to simply as diaminosiloxane compound) is especially advantageously used in the present invention. Examples of the diaminosiloxane compound of the type include those having the structure shown in Patent Document 2 (JP-A-2-91124).

[Chemical Formula 7]

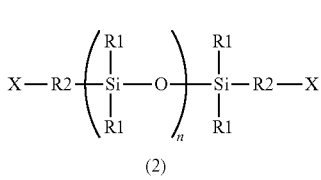

(2)

(wherein R1 represents a hydrocarbon group having from 1 to 6 carbon atoms; R2 represents a divalent organic group; X represents an amino group, a carboxylic acid group, a halide carboxylate group or a carboxylic anhydride group; and n indicates an integer of from 1 to 50).

[Chemical Formula 8]

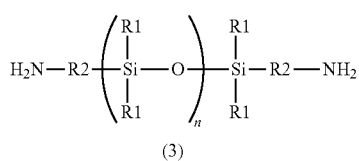

(3)

(wherein R1 represents a hydrocarbon group having from 1 to 6 carbon atoms; R2 represents a divalent organic group; and n indicates an integer of from 1 to 50).

As the siloxane-containing compound such as the diaminosiloxane compound for use in the present invention, those having a weight average molecular weight of from 200 to 5000, preferably from 200 to 2500 are advantageously used.

Not only one but also two or more kinds of those siloxane-containing compounds may be used either singly or as combined.

The siloxane-containing compound is used in such a mole ratio that the [(R1)$_2$Si—O—] unit content (Hereinafter, this may be referred to as "siloxane content.") of the intended siloxane-modified hyperbranched polyimide may be from 0.1 to 70 wt %, preferably from 0.3 to 50 wt %.

The siloxane-modified hyperbranched polyimide of the present invention can be produced by using the above-mentioned aromatic tetracarboxylic dianhydride, triamine compound and siloxane-containing compound. Depending on the reaction method of reacting these compounds, siloxane-modified hyperbranched polyimides having different structures as in FIG. 2 through FIG. 4 can be obtained.

For example, in producing the siloxane-modified hyperbranched polyimide having the structure shown in FIG. 2, an aromatic tetracarboxylic dianhydride, an aromatic triamine and a siloxane-containing compound are added to an appropriate solvent all together; or any two of the three compounds are first added, followed by adding the remaining one compound before the reaction of the two compounds is finished, and the obtained solution is stirred. Accordingly, in the solution, reaction of the aromatic tetracarboxylic dianhydride with the aromatic triamine and reaction of the aromatic tetracarboxylic dianhydride (or triamine) with the siloxane-containing compound progress randomly, thereby a siloxane-modified hyperbranched polyamic acid having a siloxane structure irregularly in a molecule thereof can be obtained. Then, the obtained siloxane-modified hyperbranched polyamic acid is subjected to a heat treatment or chemical treatment, whereby the polyamic acid is imidized and a siloxane-modified hyperbranched polyimide irregularly having a siloxane structure in a molecule thereof as shown in FIG. 2 (random copolymer) can be obtained.

In producing the siloxane-modified hyperbranched polyimide having the structure shown in FIG. 3, an aromatic tetracarboxylic dianhydride and a diaminosiloxane compound are first added to an appropriate solvent and stirred, whereby the two compounds are reacted so as to produce a derivative intermediate of an aromatic tetracarboxylic dianhydride having a siloxane structure derived from the diaminosiloxane compound (this may be referred to as derivative in this paragraph). After this, an aromatic triamine is added to the reaction solution and stirred, whereupon reaction of the derivative and the aromatic triamine, and reaction of the unreacted aromatic tetracarboxylic dianhydride in the solution and the aromatic triamine progress, thereby there is obtained a siloxane-modified hyperbranched polyamic acid having a regularly-repeating siloxane structure unit in a molecule thereof, as compared with the siloxane-modified hyperbranched polyamic acid obtained according to the above-mentioned process. Then, the obtained siloxane-modified hyperbranched polyamic acid is subjected to a heat or chemical treatment to obtain a siloxane-modified hyperbranched polyimide having a regularly-repeating siloxane structure unit in a molecule thereof (block copolymer), as compared with FIG. 2, as shown in FIG. 3.

In producing the siloxane-modified hyperbranched polyimide having the structure shown in FIG. 4, an aromatic tetracarboxylic dianhydride and an aromatic triamine are first added to an appropriate solvent and reacted by stirring, thereby there is synthesized a hyperbranched polyamic acid having an acid anhydride end and/or an amine terminal. Next, a siloxane-containing compound is added to the reaction solution and stirred, thereby there is obtained a siloxane-modified hyperbranched polyamic acid having a structure where the hyperbranched polyamic acid molecules are crosslinked each other with the siloxane-containing compound. Then, the obtained siloxane-modified hyperbranched polyamic acid is subjected to a heat or chemical treatment, whereby there is obtained a siloxane-modified hyperbranched polyimide having a chemical structure where relatively large polyimide moieties (in which a large number of polyimide structural units exist) are crosslinked with a siloxane moiety as shown in FIG. 4.

Production of the above-mentioned siloxane-modified hyperbranched polyimide is desirably conducted in an appropriate solvent. Examples of the solvent usable in the present invention include an polar aprotic solvents such as N-methyl-2-pyrrolidone, N,N-dimethylacetamide, dimethyl formamide, dimethyl sulfoxide, tetramethyl sulfone, hexamethyl sulfone, hexamethyl phosphamide; phenolic solvents such as m-cresol, o-cresol, m-chlorophenol, o-chlorophenol; and ether solvents such as dioxane, tetrahydrofuran, diglyme. Any one of, or any combination of these solvents may be used. In the above-mentioned methods, it is desirable that every reaction is conducted at a relatively low temperature, concretely at a temperature at 100° C. or lower, preferably 50° C. or lower.

The thus-obtained siloxane-modified hyperbranched polyimide of the present invention may be used for various applications, not only as a molding material but also as other materials such as a film, a coating, a paint, an adhesive, and a separation membrane. In case of producing a siloxane-modified hyperbranchd polyimide material in a thin film for the purpose of using it as the above mentioned applications, the siloxane-modified hyperbranchd polyimide material can be produced according to the following methods similar to the typical polymer material such as traditional polyimides. Namely, examples of the methods include: 1) a method for casting the reaction solution that contains the above-mentioned siloxane-modified hyperbranched polyamic acid (hereinafter this may be referred to simply as reaction solution), onto a substrate such as glass or polymer film, and then thermally treating (heating and drying) the casting solution; 2) a method for casting the reaction solution onto a substrate such as glass or polymer film, then immersing the solution on the substrate in a poor solvent such as water, alcohol, or hexane, for film formation, and followed by heat treatment (heating and drying); 3) a method for applying a heat treatment or the like to the reaction solution whereby the hyperbranched polyamic acid contained therein is subjected to imidization (cyclodehydration), then casting the solution to form a film, followed by drying; and 4) a method for casting the solution in which the hyperbranched polyamic acid has been previously imidized in the above 3), onto a substrate, then immersing the solution in the same poor solvent as in the above 2) for film formation, followed by a heat treatment (heating and drying). In the present invention, any of these methods is applicable.

The siloxane-modified hyperbranched polyimide of the present invention produced in the above manner is capable of exhibiting excellent electric properties (low dielectric constant), gas permeability and permselectivity. Accordingly, those excellent effects can also be advantageously affected in a gas separation film, an insulation film for microelectronic material and a heat-resistant adhesive that comprise the hyperbranched polyimide-based hybrid material.

In the siloxane-modified hyperbranched polyimide according to the present invention, the reactive end groups (amino group, acid anhydride group) of the siloxane-modified hyperbranched polyimide may be chemically modified with various compounds to provide functional groups to the molecule, whereby the polyimide can be made to exhibit various functions.

For example, the chemical modification by using an amine, a carboxylic acid, a halide carboxylate, a carboxylic anhydride, or a fluorine-containing compound or a silicon-containing compound of any of those compounds can be applied to afford lower dielectric property and more excellent surface properties such as hydrophobicity, adhesive property, to the modified derivatives.

Further, siloxane-modified hyperbranched polyimide having photosensitivety can be produced through chemical modification with a compound having photosensitivity; a siloxane-modified hyperbranched polyimide advantageously usable as a sensor material can be produced through chemical modification with a compound having sensor function; and a siloxane-modified hyperbranched polyimide advantageously usable as a immobilized enzyme or a supported catalyst can be produced through chemical modification with an enzyme or a metallic compound which act as an enzyme or a catalyst compound.

Needless to say, in the use of the siloxane-modified hyperbranched polyimide of the present invention, a polyimide having a different structure than that of the hyperbranched polyimide constituting it, or any other resin and further any known antioxidant, thermal stabilizer, ultraviolet absorbent, filler and the like may be compounded thereinto.

EXAMPLES

Some Examples of the present invention will be described to more concretely clarify the present invention. It is to be understood that the invention is not limited to the details of illustrated examples and the foregoing description, but may be embodied with various changes, modifications and improvement, which may occur to those skilled in the art without departing from the scope of the invention defined in the attached claims. The siloxane content investigated in the following Examples and Comparative Examples means the [—$(CH_3)_2$Si—O—] unit content of the product.

Example 1

0.898 g of 1,3,5-tris(4-aminophenoxy)benzene (TAPOB) and 0.062 g of bis(γ-aminopropyl)polydimethyl siloxane (PSX; in Example 1, one having an amine equivalent of 130 (PSX-130) was used) were put into a 100-ml four-necked flask equipped with a stirrer, a nitrogen-introducing tube filled with calcium chloride and a thermometer; and 35 mL of a co solvent of dimethyl acetamide (DMAc) and diethylene glycol dimethyl ether (diglyme, DIG) (DMAc/DIG=50 vol. %:50 vol. %—hereinafter this may be referred to simply as co solvent) was added thereto and dissolved. With the solution kept stirred, a solution prepared by dissolving 0.775 g of oxydiphthalic dianhydride (ODPA) in 35 mL of co solvent was gradually added thereto under a temperature condition of 25° C., and then stirred at 25° C. for 3 hours to react them, thereby a siloxane-modified hyperbranched polyamic acid was synthesized.

The obtained solution of siloxane-modified hyperbranched polyamic acid was cast onto a polyester film, and dried at 80° C. for 3 hours to form a film of the siloxane-modified hyperbranched polyamic acid. The film was subjected to a heat treatment in a nitrogen atmosphere at 100° C. for 1 hour, at 200° C. for 1 hour and further at 250° C. for 2 hours to obtain a polymer. The obtained polymer contained 2.1 wt % of siloxane evaluated in terms of siloxane ([—$(CH_3)_2$Si—O—] evaluation—the same shall apply hereinunder).

By measurement of infrared spectrum in accordance with FT-IR for the polymer, there were characteristic absorption bands at 1785 $cm^{-1}$, 1728 $cm^{-1}$, 1380 $cm^{-1}$ and 722 $cm^{-1}$ which are attributed to a carbonyl group of polyimide, while there was not a characteristic absorption band at 1650 $cm^{-1}$ derived from a carbonyl group of the polyamic acid, which confirmed the completion of thermal imidization of the polyamic acid. In addition, there were characteristic absorption bands at 1100 $cm^{-1}$ and 820 $cm^{-1}$ derived from a silanol group, and further there was a characteristic absorption band at 2900 $cm^{-1}$ derived from a side chain methyl group of PSX. The result confirmed that the obtained polymer is a siloxane-modified hyperbranched polyimide according to the present invention.

Ultraviolet-visible transmittance measurement for the obtained polymer was conducted, showing a light transmittance of 29.4% at a wavelength of 600 nm. A differential scanning calorimetric analysis (DSC measurement) and a thermogravimetic analysis (TGA measurement) were carried out in a nitrogen atmosphere at a heating rate of 10° C./min, showing a glass transition temperature (Tg) of 267.1° C. and a thermal decomposition temperature (5% weight loss temperature: $T_d^5$) of 508.9° C. Further, a thermo mechanical analysis (TMA measurement) in a nitrogen atmosphere at a heating rate of 5° C./min to determine a coefficient of thermal expansion (CTE) thereof, which was 46.7 ppm/° C. In addition, a tensile strength of the polymer was 155.2 MPa, a tensile modulus (Young's modulus) thereof was 2.47 GPa, an elongation at break thereof was 13.8%, and a dielectric constant (1 MHz) thereof was 3.2.

Example 2

A solution of a siloxane-modified hyperbranched polyamic acid was obtained in the same manner as in Example 1, except for that, 0.180 g of PSX (PSX-360) having an amine equivalent of 360 was used as the aromatic triamine. 0.92 g of heptafluorobutyric anhydride (7FBA) was added to the solution, followed by stirring at 25° C. for 2 hours, whereby there was obtained a solution of a siloxane-modified hyperbranched polyamic acid whose ends were modified with a fluorine-containing compound. The obtained solution was dried and followed by an application of a heat treatment in the same manner as in Example 1, whereby a polymer was obtained. The obtained polymer contained 6.6 wt % of siloxane, evaluated in terms of siloxane.

FT-IR measurement was conducted for the obtained polymer, and like in Example 1, there were characteristic absorption bands which is attributed to a carbonyl group of polyimide and which is derived from a silanol bond, and in addition, there were characteristic absorption bands at 1155 $cm^{-1}$ and 1220 $cm^{-1}$ to be derived from a carbon-fluorine (C—F) bond. The result confirmed that the obtained polymer was a siloxane-modified hyperbranched polyamic acid whose ends were modified with a fluorine-containing compound.

The characteristics of the obtained polymer were also investigated as in Example 1. The results are shown in Table 2.

Examples 3 to 7

Five kinds of polymers were obtained in the same manner as in Example 1, except for that, any of PSX-130, PSX-360, or PSX (PSX-460) having an amine equivalent of 460 was used as the diaminosiloxane compound in the amount indicated in Table 1, and the amount of TAPOB to be used was varied in accordance with the type and the amount of PSX used. The used amount of each compound is shown in Table 1.

FT-IR measurement was conducted for these five polymers, and the same results as in Example 1 were obtained. Accordingly, the obtained polymers were all siloxane-modified hyperbranched polyimides. In addition, also like in Example 1, the characteristics of the obtained polymers were investigated. The results are shown in Table 2.

Examples 8 to 14

A total of seven kinds of polymers were obtained by using 4,4'-(hexafluoroisopropylidene) diphthalic dianhydride (6FDA), any one of three kinds of PSX's having a different amine equivalent respectively, and TAPOB, and the same manner as in Example 1 was applied to Examples 8 to 13; and in Example 14, 7FBA was additionally used and the same manner as in Example 2 was applied. The used amount of each compound used in producing these polymers is shown in Table 1.

FT-IR measurement was conducted for these seven polymers, and the polymers of Examples 8 to 13 had the same results as in Example 1, which confirmed that the obtained polymers were all siloxane-modified hyperbranched polyimides. The polymer of Example 14 had the same results as in Example 2, which confirmed that the obtained polymer was a siloxane-modified hyperbranched polyamic acid whose ends were modified with a fluorine-containing compound. Like in Example 1, the characteristics of the obtained polymers were investigated. The results are shown in Table 2.

Example 15

1.111 g of 4,4'-(hexafluoroisopropylidene)diphthalic anhydride (6FDA) was put into a 100-ml four-necked flask equipped with a stirrer, a nitrogen-introducing tube filled with calcium chloride and a thermometer; and 35 mL of co solvent was added thereto and dissolved. With the solution kept stirred, a solution prepared by dissolving 0.090 g of PSX (PSX-360) having an amine equivalent of 360 in 4 mL of co solvent was gradually added thereto at room temperature and reacted. After the dropwise addition, this was further stirred for 2 hours and reacted. Then, with the reaction solution kept stirred, a solution prepared by dissolving 0.449 g of TAPOB in 15 mL of co solvent was gradually dropwise added into the reaction solution at room temperature and reacted. After the dropwise addition, this was further reacted for 3 hours to produce a siloxane-modified hyperbranched polyamic acid. The obtained solution of siloxane-modified hyperbranched polyamic acid was dried and subjected to a heat treatment in the same manner as in Example 1 to obtain a polymer. The obtained polymer contained 4.7 wt % of siloxane, evaluated in terms of siloxane.

FT-IR measurement was conducted for the obtained polymer, and like in Example 1, there were characteristic absorp-

TABLE 1

| Example No. | Dianhydride Monomer | Amount used [g] | Triamine Monomer | Amount used [g] | PSX | Amount used [g] | Terminal-Modifying Compound | Amount used [g] | Siloxane Content [wt. %] |
|---|---|---|---|---|---|---|---|---|---|
| 1 | ODPA | 0.775 | TAPOB | 0.898 | PSX-130 | 0.062 | — | — | 2.1 |
| 2 | ODPA | 0.775 | TAPOB | 0.898 | PSX-360 | 0.180 | 7FBA | 0.92 | 5.7 |
| 3 | ODPA | 0.775 | TAPOB | 0.699 | PSX-130 | 0.186 | — | — | 6.6 |
| 4 | ODPA | 0.775 | TAPOB | 0.898 | PSX-360 | 0.180 | — | — | 8.6 |
| 5 | ODPA | 0.775 | TAPOB | 0.699 | PSX-360 | 0.540 | — | — | 23.6 |
| 6 | ODPA | 0.775 | TAPOB | 0.898 | PSX-460 | 0.230 | — | — | 11.1 |
| 7 | ODPA | 0.775 | TAPOB | 0.699 | PSX-460 | 0.690 | — | — | 29.1 |
| 8 | 6FDA | 1.111 | TAPOB | 0.898 | PSX-130 | 0.062 | — | — | 1.7 |
| 9 | 6FDA | 1.111 | TAPOB | 0.699 | PSX-130 | 0.186 | — | — | 5.4 |
| 10 | 6FDA | 1.111 | TAPOB | 0.898 | PSX-360 | 0.180 | — | — | 7.2 |
| 11 | 6FDA | 1.111 | TAPOB | 0.699 | PSX-360 | 0.540 | — | — | 20.1 |
| 12 | 6FDA | 1.111 | TAPOB | 0.898 | PSX-460 | 0.230 | — | — | 9.4 |
| 13 | 6FDA | 1.111 | TAPOB | 0.699 | PSX-460 | 0.690 | — | — | 25.0 |
| 14 | 6FDA | 1.111 | TAPOB | 0.898 | PSX-360 | 0.180 | 7FBA | 0.92 | 5.1 |

TABLE 2

| Example No. | Tg [° C.] | $T_d^5$ [° C.] | CTE [ppm/° C.] | Tensile Strength [MPa] | Young's Modulus [GPa] | Elongation at Break [%] | Dielectric Constant [1 MHz] | Transmittance [%] |
|---|---|---|---|---|---|---|---|---|
| 1 | 267.1 | 508.9 | 46.7 | 155.2 | 2.47 | 13.8 | 3.2 | 29.4 |
| 2 | — | 360.7 | 56.9 | 104.4 | 1.98 | 20.6 | 2.8 | 59.2 |
| 3 | 295.0 | 474.2 | 65.8 | 119.7 | 2.25 | 9.6 | 3.1 | 53.9 |
| 4 | — | 476.6 | 72.9 | 72.3 | 2.24 | 4.4 | 3.0 | 36.4 |
| 5 | — | 458.4 | 68.4 | 86.9 | 1.63 | 19.4 | 2.8 | 46.5 |
| 6 | 192.3 | 477.4 | 48.0 | 58.5 | 2.14 | 3.5 | 2.9 | 12.3 |
| 7 | 237.4 | 454.0 | 148.3 | 57.3 | 1.34 | 8.3 | 2.8 | 61.0 |
| 8 | 245.2 | 483.4 | — | 145.9 | 2.49 | 13.3 | — | 23.0 |
| 9 | 239.7 | 475.9 | 60.0 | 45.9 | 2.27 | 1.8 | 2.8 | 73.6 |
| 10 | — | 475.0 | 57.3 | 103.6 | 2.23 | 7.5 | 2.9 | 26.9 |
| 11 | 277.2 | 461.7 | 100.2 | 76.1 | 1.8 | 11.2 | 2.7 | 44.7 |
| 12 | 258.0 | 469.7 | 82.1 | 106.1 | 2.12 | 15.8 | 2.8 | 39.4 |
| 13 | 199.1 | 458.9 | 133.6 | 62.6 | 1.38 | 18.8 | 2.7 | 68.7 |
| 14 | 172.8 | 381.5 | — | 106.2 | 1.98 | 13.3 | 2.8 | 29.9 | tion bands which is attributed to a carbonyl group of polyimide and which is derived from a silanol bond. The result confirmed that the obtained polymer was a siloxane-modified hyperbranched polyimide. Also like in Example 1, the characteristic of the obtained polymer were investigated. The results are shown in Table 4.

Example 16

A polymer was obtained in the same manner as in Example 15, except for that, 0.034 g of PSX-130 was used in place of PSX-360. The used amount of each compound is shown in Table 3. FT-IR measurement was conducted for the obtained polymer, and the same results as in Example 1 were obtained. This confirmed that the polymer was also a siloxane-modified hyperbranched polyimide. Like in Example 1, the characteristics of the obtained polymer were investigated. The results are shown in Table 4.

Examples 17 to 19

Three kinds of polymers were obtained in the same manner as in Example 15, except for that, ODPA was used in place of 6FDA and PSX's having a different amine equivalent were used. The used amount of each compound is shown in Table 3. FT-IR measurement was conducted for the obtained polymers, and the same results as in Example 1 were obtained. Accordingly, the obtained polymers were siloxane-modified hyperbranched polyimides. In addition, also like in Example 1, the characteristics of the obtained polymers were investigated. The results are shown in Table 4.

reaction solution kept stirred, a solution prepared by dissolving 0.053 g of PSX-360 (amine equivalent: 360) in 4 mL of co solvent was dropwise added into the reaction solution at room temperature. After the addition, this was further reacted for 3 hours to produce a solution of a siloxane-modified hyperbranched polyamic acid. The obtained solution dried and subjected to a heat treatment in the same manner as in Example 1 to obtain a polymer. The obtained polymer contained 2.3 wt % of siloxane, evaluated in terms of siloxane.

FT-IR measurement was conducted for the obtained polymer, and like in Example 1, there were characteristic absorption bands which is attributed to a carbonyl group of polyimide and absorption which is derived from a silanol bond. The result confirmed that the obtained polymer was a siloxane-modified hyperbranched polyimide. Also like in Example 1, the characteristics of the obtained polymer were investigated. The results are shown in Table 7.

Example 21

A solution prepared by dissolving 0.27 g of 3,5-bistrifluoromethylaniline (6FMA) in 4 mL of co solvent was dropwise added to the solution of the siloxane-modified hyperbranched polyamic acid obtained in the same manner as in Example 20 at room temperature, while stirring the solution of the polyamic acid, thereby obtaining a siloxane-modified hyperbranched polyamic acid whose ends were modified with a 6FMA. The solution of the obtained siloxane-modified hyperbranched polyamic acid was dried and subjected to a

TABLE 3

| Example No. | Dianhydride Monomer | Amount Used [g] | Triamine Monomer | Amount Used [g] | PSX | Amount Used [g] | Siloxane Content [wt. %] |
| --- | --- | --- | --- | --- | --- | --- | --- |
| 15 | 6FDA | 1.111 | TAPOB | 0.449 | PSX-360 | 0.090 | 4.7 |
| 16 | 6FDA | 1.111 | TAPOB | 0.449 | PSX-130 | 0.034 | 1.2 |
| 17 | OPDA | 0.775 | TAPOB | 0.449 | PSX-130 | 0.034 | 1.5 |
| 18 | OPDA | 0.775 | TAPOB | 0.449 | PSX-360 | 0.090 | 6.0 |
| 19 | OPDA | 0.775 | TAPOB | 0.449 | PSX-460 | 0.115 | 7.9 |

TABLE 4

| Example No. | Tg [° C.] | $T_d^5$ [° C.] | Tensile Strength [MPa] | Young's Modulus [GPa] | Elongation at Break [%] | Dielectric Constant [1 MHz] | Transmittance [%] |
| --- | --- | --- | --- | --- | --- | --- | --- |
| 15 | — | 496.4 | 116.4 | 2.34 | 11.7 | 2.7 | — |
| 16 | 217.5 | 444.9 | — | — | — | 2.9 | 89.1 |
| 17 | — | 486.8 | 144.1 | 2.38 | 15.2 | 2.9 | — |
| 18 | 188.8 | 443.1 | 125.8 | 2.21 | 10.7 | 2.9 | 84.8 |
| 19 | 206.6 | 440.5 | — | — | — | 2.8 | 85.0 |

Example 20

1.333 g of 6FDA was put into a 100-ml four-necked flask equipped with a stirrer, a nitrogen-introducing tube filled with calcium chloride and a thermometer; and 35 mL of co solvent was added thereto and dissolved. With the solution kept stirred, a solution prepared by dissolving 0.599 g of TAPOB in 20 mL of co solvent was gradually added thereto at room temperature and reacted. After the dropwise addition, this was further stirred for 2 hours and reacted. Then, with the heat treatment in the same manner as in Example 1 to obtain a polymer. The obtained polymer contained 2.0 wt % of siloxane evaluated in terms of siloxane.

FT-IR measurement was conducted for the polymer, and like in Example 1, there were recognized absorptions which is attributed to a carbonyl group of polyimide and which is derived from a silanol bond. Further, there were characteristic absorption bands at 1155 cm$^{-1}$ and 1220 cm$^{-1}$ which are derived from a C—F bond. The result confirmed that the obtained polymer was a siloxane-modified hyperbranched polyamic acid whose ends were modified with a fluorine-containing compound.

Also like in Example 1, the characteristics of the obtained polymer were investigated. The results are shown in Table 7. Further, the gas permeability measurement was conducted for the polymer in accordance with a constant volume method (JIS Test Method: JIS-Z-1707) under a condition of 1 atm and 25° C. The measurement results are shown in Table 9 below.

Examples 22 to 49

(End-modified) siloxane-modified hyperbranched polyamic acids were obtained by using an appropriate amount of each compound shown in Table 5 and Table 6 and in the same manner as in Example 20 (or Example 21). In the same manner as in Example 1, the (end-modified) siloxane-modified hyperbranched polyamic acids were dried and subjected to a heat treatment, whereby 28 kinds of polymers were obtained.

FT-IR measurement was conducted for these 28 polymers, and all of them had the same results as in Example 1. Accordingly, it was recognized that the obtained polymers were siloxane-modified hyperbranched polyimides. Then, FT-IR measurement was conducted for the polymers (Examples 23 to 29, 31 to 34, 36 to 39, 41 to 44, and 46 to 49). The polymers were obtained by synthesizing siloxane-modified hyperbranched polyamic acids whose molecular ends were modified with any one of aniline compounds selected from 6FMA, aniline, m-trifluoromethylaniline (m-3FMA) and p-trifluoromethylaniline (p-3FMA), followed by drying and a heat treatment. As a result of FT-IR measurement, it was confirmed that these polymers were siloxane-modified hyperbranched polyimides whose molecular ends were modified with 6FMA (or any of aniline, m-3FMA, p-3FMA). The characteristics of the obtained polymers were investigated as in Example 1. The results are shown in Table 7 and Table 8. Further, the gas permeability measurement was conducted for the polymers obtained in Examples 25, 30 and 32 in the same manner as in Example 21. The results are shown in Table 9.

TABLE 5

| Example No. | Dianhydride Monomer | Amount used [g] | Triamine Monomer | Amount used [g] | PSX | Amount used [g] | Terminal-Modifying Compound | Amount used [g] | Siloxane Content [wt. %] |
|---|---|---|---|---|---|---|---|---|---|
| 20 | 6FDA | 1.333 | TAPOB | 0.599 | PSX-360 | 0.053 | — | — | 2.3 |
| 21 | 6FDA | 1.333 | TAPOB | 0.599 | PSX-360 | 0.053 | 6FMA | 0.27 | 2.0 |
| 22 | 6FDA | 1.333 | TAPOB | 0.599 | PSX-130 | 0.019 | — | — | 0.6 |
| 23 | 6FDA | 1.333 | TAPOB | 0.599 | PSX-130 | 0.019 | Aniline | 0.11 | 0.6 |
| 24 | 6FDA | 1.333 | TAPOB | 0.599 | PSX-130 | 0.019 | m-3FMA | 0.19 | 0.5 |
| 25 | 6FDA | 1.333 | TAPOB | 0.599 | PSX-130 | 0.019 | p-3FMA | 0.19 | 0.5 |
| 26 | 6FDA | 1.333 | TAPOB | 0.599 | PSX-130 | 0.019 | 6FMA | 0.27 | 0.5 |
| 27 | 6FDA | 1.333 | TAPOB | 0.599 | PSX-360 | 0.053 | Aniline | 0.11 | 2.3 |
| 28 | 6FDA | 1.333 | TAPOB | 0.599 | PSX-360 | 0.053 | m-3FMA | 0.19 | 2.2 |
| 29 | 6FDA | 1.333 | TAPOB | 0.599 | PSX-360 | 0.053 | p-3FMA | 0.19 | 2.2 |
| 30 | 6FDA | 1.333 | TAPOB | 0.599 | PSX-460 | 0.069 | — | — | 3.2 |
| 31 | 6FDA | 1.333 | TAPOB | 0.599 | PSX-460 | 0.069 | Aniline | 0.11 | 3.0 |
| 32 | 6FDA | 1.333 | TAPOB | 0.599 | PSX-460 | 0.069 | m-3FMA | 0.19 | 2.9 |
| 33 | 6FDA | 1.333 | TAPOB | 0.599 | PSX-460 | 0.069 | p-3FMA | 0.19 | 2.9 |
| 34 | 6FDA | 1.333 | TAPOB | 0.599 | PSX-460 | 0.069 | 6FMA | 0.27 | 2.8 |

TABLE 6

| Example No. | Dianhydride Monomer | Amount used [g] | Triamine Monomer | Amount used [g] | PSX | Amount used [g] | Terminal-Modifying Compound | Amount used [g] | Siloxane Content [wt. %] |
|---|---|---|---|---|---|---|---|---|---|
| 35 | ODPA | 0.930 | TAPOB | 0.599 | PSX-130 | 0.019 | — | — | 0.8 |
| 36 | ODPA | 0.930 | TAPOB | 0.599 | PSX-130 | 0.019 | Aniline | 0.11 | 0.7 |
| 37 | ODPA | 0.930 | TAPOB | 0.599 | PSX-130 | 0.019 | m-3FMA | 0.19 | 0.7 |
| 38 | ODPA | 0.930 | TAPOB | 0.599 | PSX-130 | 0.019 | p-3FMA | 0.19 | 0.7 |
| 39 | ODPA | 0.930 | TAPOB | 0.599 | PSX-130 | 0.019 | 6FMA | 0.27 | 0.6 |
| 40 | ODPA | 0.930 | TAPOB | 0.599 | PSX-360 | 0.053 | — | — | 3.0 |
| 41 | ODPA | 0.930 | TAPOB | 0.599 | PSX-360 | 0.053 | Aniline | 0.11 | 2.8 |
| 42 | ODPA | 0.930 | TAPOB | 0.599 | PSX-360 | 0.053 | m-3FMA | 0.19 | 2.7 |
| 43 | ODPA | 0 930 | TAPOB | 0.599 | PSX-360 | 0.053 | p-3FMA | 0.19 | 2.7 |
| 44 | ODPA | 0.930 | TAPOB | 0.599 | PSX-360 | 0.053 | 6FMA | 0.27 | 2.5 |
| 45 | ODPA | 0.930 | TAPOB | 0.599 | PSX-460 | 0.069 | — | — | 3.9 |
| 46 | ODPA | 0.930 | TAPOB | 0.599 | PSX-460 | 0.069 | Aniline | 0.11 | 3.7 |
| 47 | ODPA | 0.930 | TAPOB | 0.599 | PSX-460 | 0.069 | m-3FMA | 0.19 | 3.6 |
| 48 | ODPA | 0.930 | TAPOB | 0.599 | PSX-460 | 0.069 | p-3FMA | 0.19 | 3.6 |
| 49 | ODPA | 0.930 | TAPOB | 0.599 | PSX-460 | 0.069 | 6FMA | 0.27 | 3.4 |

TABLE 7

| Example No. | $T_g$ [° C.] | $T_d^5$ [° C.] | CTE [ppm/° C.] | Tensile Strength [MPa] | Young's Modulus [GPa] | Elongation at Break [%] | Dielectric Constant [1 MHz] | Transmittance [%] |
|---|---|---|---|---|---|---|---|---|
| 20 | 239.8 | 472.6 | 48.6 | 123.7 | 2.45 | 11.6 | 2.8 | 85.3 |
| 21 | 224.2 | 438.1 | 61.6 | 86.0 | 2.45 | 4.5 | 2.6 | 86.0 |

TABLE 7-continued

| Example No. | Tg [°C.] | $T_d^5$ [°C.] | CTE [ppm/°C.] | Tensile Strength [MPa] | Young's Modulus [GPa] | Elongation at Break [%] | Dielectric Constant [1 MHz] | Transmittance [%] |
|---|---|---|---|---|---|---|---|---|
| 22 | 236.8 | 482.3 | 51.0 | 136.6 | 2.61 | 10.5 | 2.9 | 88.2 |
| 23 | 247.7 | 479.1 | 45.6 | 106.2 | 2.60 | 5.2 | 2.9 | 87.5 |
| 24 | 225.8 | 454.1 | 52.8 | 98.1 | 2.59 | 6.1 | 2.8 | 88.7 |
| 25 | 244.1 | 481.9 | 51.5 | 103.3 | 2.58 | 6.6 | 2.8 | 87.6 |
| 26 | 227.1 | 442.5 | 49.6 | 124.9 | 2.57 | 8.2 | 2.7 | 88.4 |
| 27 | 226.3 | 446.4 | 52.2 | 71.0 | 2.45 | 3.1 | 2.9 | 82.7 |
| 28 | 228.8 | 471.9 | 57.6 | 125.6 | 2.43 | 8.3 | 2.8 | 88.0 |
| 29 | 232.7 | 443.5 | 54.5 | 101.3 | 2.44 | 5.4 | 2.8 | 86.6 |
| 30 | 237.2 | 454.5 | 58.7 | 91.0 | 2.29 | 7.6 | 2.8 | 87.2 |
| 31 | 231.8 | 467.1 | 55.0 | 120.1 | 2.26 | 12.5 | 2.8 | 88.6 |
| 32 | 216.9 | 446.8 | 54.4 | 96.0 | 2.25 | 9.8 | 2.8 | 88.1 |
| 33 | 233.5 | 454.4 | 53.1 | 105.8 | 2.25 | 9.8 | 2.8 | 87.7 |
| 34 | 218.3 | 462.8 | 58.4 | 111.1 | 2.24 | 7.6 | 2.5 | 88.1 |

TABLE 8

| Example No. | Tg [°C.] | $T_d^5$ [°C.] | CTE [ppm/°C.] | Tensile Strength [MPa] | Young's Modulus [GPa] | Elongation at Break [%] | Dielectric Constant [1 MHz] | Transmittance [%] |
|---|---|---|---|---|---|---|---|---|
| 35 | 213.2 | 465.4 | 52.4 | 137.9 | 2.56 | 14.0 | 3.0 | 79.7 |
| 36 | 205.4 | 483.1 | 44.7 | 135.5 | 2.52 | 7.8 | 3.1 | 86.0 |
| 37 | 209.3 | 490.4 | 52.1 | 137.5 | 2.54 | 11.6 | 3.0 | 85.2 |
| 38 | 219.3 | 470.7 | 52.7 | 123.4 | 2.51 | 9.4 | 3.0 | 84.9 |
| 39 | 197.4 | 419.5 | 52.1 | 139.8 | 2.54 | 8.4 | 2.8 | 84.1 |
| 40 | 227.8 | 449.9 | 52.1 | 115.4 | 2.31 | 7.5 | 3.0 | 79.3 |
| 41 | 205.1 | 462.5 | 54.6 | 115.2 | 2.36 | 9.6 | 3.0 | 84.0 |
| 42 | 196.4 | 438.4 | 56.9 | 104.5 | 2.33 | 12.9 | 3.0 | 82.3 |
| 43 | 215.7 | 466.1 | 55.3 | 124.3 | 2.31 | 11.7 | 3.0 | 82.4 |
| 44 | 210.3 | 446.7 | 49.5 | 128.8 | 2.26 | 11.0 | 2.7 | 76.7 |
| 45 | 218.0 | 474.4 | 50.0 | 119.9 | 2.2 | 12.9 | 3.0 | 85.4 |
| 46 | 222.3 | 489.4 | 56.1 | 121.2 | 2.14 | 14.9 | 3.0 | 86.4 |
| 47 | 203.5 | 465.8 | 62.5 | 93.7 | 2.18 | 14.7 | 3.0 | 85.1 |
| 48 | 213.1 | 461.6 | 61.5 | 123.5 | 2.19 | 15.4 | 3.0 | 85.1 |
| 49 | 207.1 | 450.1 | 56.7 | 114.8 | 2.18 | 11.7 | 2.6 | 84.0 |

TABLE 9

| | Gas Permeability Coefficient $(P \times 10^{-10}$ [cm$^3$(STP)cm/cm$^2$ · sec · cmHg]) | | | | Permselectivity ($\alpha$) | |
|---|---|---|---|---|---|---|
| Example No. | $CO_2$ | $O_2$ | $N_2$ | $CH_4$ | $O_2/N_2$ | $CO_2/CH_4$ |
| 21 | 9.0 | 1.9 | 0.30 | 0.15 | 6.3 | 60 |
| 25 | 7.2 | 1.5 | 0.23 | 0.11 | 6.5 | 65 |
| 30 | 5.4 | 1.2 | 0.16 | 0.077 | 7.5 | 70 |
| 32 | 6.3 | 1.3 | 0.19 | 0.1 | 6.8 | 63 |

Examples 50 to 55

A solution of a siloxane-modified hyperbranched polyamic acid was obtained in the same manner as in Example 20, for which, however, ODPA or 6FDA was used as the aromatic tetracarboxylic dianhydride (acid dianhydride monomer) and an appropriate amount of any of various PSXs shown in Table 10 was used. Next, the solution of a siloxane-modified hyperbranched polyamic acid whose molecular ends were modified is obtained in the same manner as in Example 21, except for that, a solution prepared by dissolving 0.14 g of 6FMA and 0.27 g of 1H, 1H-heptadecafluoromethylamine (17FA) in 4 mL of co solvent was used instead of the 6FMA solution used in Example 21. The obtained solution was dried and subjected to a heat treatment in the same manner as in Example 1, whereby 6 kinds of polymers were obtained.

FT-IR measurement was conducted for the obtained polymers, and it was confirmed that all the polymers were siloxane-modified hyperbranched polyimides whose molecular ends were modified with 6FMA or 17FA. Like in Example 1, the characteristics of the obtained polymers were investigated. The results are shown in Table 11.

TABLE 10

| Example No. | Dianhydride Monomer | Amount used [g] | Triamine Monomer | Amount used [g] | PSX | Amount used [g] | Terminal-Modifying Compound | Amount used [g] | Siloxane Content [wt. %] |
|---|---|---|---|---|---|---|---|---|---|
| 50 | 6FDA | 1.333 | TAPOB | 0.599 | PSX-130 | 0.031 | 6FMA | 0.14 | 0.8 |
| | | | | | | | 17FA | 0.27 | |
| 51 | 6FDA | 1.333 | TAPOB | 0.599 | PSX-360 | 0.086 | 6FMA | 0.14 | 3.1 |
| | | | | | | | 17FA | 0.27 | |
| 52 | 6FDA | 1.333 | TAPOB | 0.599 | PSX-460 | 0.110 | 6FMA | 0.14 | 4.1 |
| | | | | | | | 17FA | 0.27 | |

TABLE 10-continued

| Example No. | Dianhydride Monomer | Amount used [g] | Triamine Monomer | Amount used [g] | PSX | Amount used [g] | Terminal-Modifying Compound | Amount used [g] | Siloxane Content [wt. %] |
|---|---|---|---|---|---|---|---|---|---|
| 53 | ODPA | 0.930 | TAPOB | 0.599 | PSX-130 | 0.031 | 6FMA | 0.14 | 0.9 |
|    |      |       |       |       |         |       | 17FA | 0.27 |     |
| 54 | ODPA | 0.930 | TAPOB | 0.599 | PSX-360 | 0.086 | 6FMA | 0.14 | 3.8 |
|    |      |       |       |       |         |       | 17FA | 0.27 |     |
| 55 | ODPA | 0.930 | TAPOB | 0.599 | PSX-460 | 0.110 | 6FMA | 0.14 | 5.0 |
|    |      |       |       |       |         |       | 17FA | 0.27 |     |

TABLE 11

| Example No. | Tg [° C.] | $T_d^5$ [° C.] | CTE [ppm/° C.] | Tensile Strength [MPa] | Young's Modulus [GPa] | Elongation at Break [%] | Dielectric Constant [1 MHz] | Transmittance [%] |
|---|---|---|---|---|---|---|---|---|
| 50 | 211.7 | 406.5 | 60.6 | 135.1 | 2.57 | 9.5 | 2.5 | 88.3 |
| 51 | 216.3 | 389.1 | 71.3 | 62.2 | 2.38 | 3.3 | 2.4 | 86.6 |
| 52 | 211.7 | 441.7 | 67.1 | 68.4 | 2.09 | 5.6 | — | 87.4 |
| 53 | 207.6 | 434.3 | 62.8 | 114.8 | 2.51 | 10.2 | 2.6 | 82.6 |
| 54 | 213.7 | 435.6 | 75.9 | 99.4 | 2.33 | 11.6 | 2.6 | 84.9 |
| 55 | 208.6 | 432.0 | 69.5 | 98.9 | 1.93 | 10.5 | 2.5 | 84.8 |

Comparative Example 1

1.33 g of 6FDA was put into a 100-ml four-necked flask equipped with a stirrer, a nitrogen-introducing tube filled with calcium chloride and a thermometer; and 35 mL of co solvent was added thereto and dissolved. With the solution kept stirred, a solution prepared by dissolving 0.60 g of TAPOB in 20 mL of co solvent was gradually added thereto at room temperature, and then stirred at 25° C. for 3 hours to react them, thereby a solution of a hyperbranched polyamic acid was obtained. The obtained solution was dried and subjected to a heat treatment in the same manner as in Example 1, whereby a polymer was obtained.

FT-IR measurement was conducted for the obtained polymer, and there was not recognized a characteristic absorption bands at 1650 cm$^{-1}$ which is derived from a carbonyl group of the polyamic acid, but there were characteristic absorption bands at 1785 cm$^{-1}$, 1728 cm$^{-1}$, 1380 cm$^{-1}$ and 722 cm$^{-1}$ which are attributed to a carbonyl group of polyimide, and it was confirmed that the obtained polymer is a hyperbranched polyimide as a result of completion of thermal imidization of the polyamic acid. The characteristics of the obtained polymer were investigated in the same manner as in Example 1, and the results are shown in Table 12.

Comparative Example 2

1.00 g of TAPOB was put into a 100-ml four-necked flask equipped with a stirrer, a nitrogen-introducing tube filled with calcium chloride and a thermometer; and 30 mL of co solvent was added thereto and dissolved. With the solution kept stirred, a solution prepared by dissolving 0.78 g of ODPA in 25 mL of co solvent was gradually added thereto at room temperature, and then stirred at 25° C. for 3 hours to react them, thereby producing a solution of a hyperbranched polyamic acid. The obtained solution was dried and thermally processed in the same manner as in Example 1 to obtain a polymer.

FT-IR measurement was conducted for the obtained polymer. There was the same characteristic absorption bands as in Comparative Example 1, which confirmed that the obtained polymer was a hyperbranched polyimide as a result of completion of thermal imidization of the polyamic acid. The characteristics of the obtained polymer were investigated in the same manner as in Example 1, and the results are shown in Table 12.

Comparative Example 3

0.73 g of 1,3-bis(4-aminophenoxy)benzene (TPER) was put into a 100-ml four-necked flask equipped with a stirrer, a nitrogen-introducing tube filled with calcium chloride and a thermometer; and 15 mL of co solvent was added thereto and dissolved. With the solution kept stirred, a solution prepared by dissolving 0.78 g of ODPA in 25 mL of co solvent was gradually added thereto at room temperature, and then stirred at 25° C. for 3 hours to react them, thereby a solution of a linear polyamic acid was obtained. The obtained solution was dried and subjected to a heat treatment in the same manner as in Example 1, whereby a polymer was obtained.

FT-IR measurement was conducted for the obtained polymer. There were the same characteristic absorption bands as in Comparative Example 1, which confirmed that the obtained polymer was a linear polyimide as a result of completion of thermal imidization of the linear polyamic acid. The characteristics of the obtained polymer were investigated in the same manner as in Example 1, and the results are shown in Table 12.

Comparative Example 4

0.44 g of TPER and 0.26 g of PSX (amine equivalent: 130) were put into a 100-ml four-necked flask equipped with a stirrer, a nitrogen-introducing tube filled with calcium chloride and a thermometer; and 15 mL of co solvent was added thereto and dissolved. With the solution kept stirred, a solution prepared by dissolving 0.78 g of ODPA in 25 mL of co solvent was gradually added thereto at room temperature, and then stirred at 25° C. for 3 hours to react them, thereby a solution of a linear polyamic acid was obtained. The obtained solution was dried and subjected to a heat treatment in the same manner as in Example 1, whereby a polymer was obtained.

FT-IR measurement was conducted for the obtained polymer. There were the same characteristic absorption bands as in Comparative Example 1, and absorption bands at 1100 and 820 cm$^{-1}$ which are derived from a silanol bond, furthermore an absorption band at 2900 cm$^{-1}$ which is derived from a side chain methyl group of PSX, and it was confirmed that the polymer was a linear polyimide as a result of completion of thermal imidization of the linear polyamic acid and was modified with PSX at its molecular end. Measurement of the characteristics of the obtained polymer was attempted as in Example 1, but the obtained polymer was a opaque and brittle film and it was impossible to measure its characteristics.

Comparative Example 5

0.66 g of TPER and 0.23 g of PSX (amine equivalent: 460) were put into a 100-ml four-necked flask equipped with a stirrer, a nitrogen-introducing tube filled with calcium chloride and a thermometer; and 15 mL of co solvent was added thereto and dissolved. With the solution kept stirred, a solution prepared by dissolving 1.11 g of 6FDA in 25 mL of co solvent was gradually added thereto at room temperature, and then stirred at 25° C. for 3 hours to react them, thereby a solution of a linear polyamic acid was obtained. The obtained solution was dried and subjected to a heat treatment in the same manner as in Example 1, whereby a polymer was obtained.

FT-IR measurement was conducted for the obtained polymer. There were the same characteristic absorption bands as in Comparative Example 4, and it was confirmed that the polymer was a linear polyimide as a result of completion of thermal imidization of the linear polyamic acid and this is modified with PSX at its molecular end. Measurement of the characteristics of the obtained polymer was attempted as in Example 1, but the obtained polymer was a opaque and brittle film and it was impossible to measure its characteristics.

TABLE 12

| Comparative Example No. | Tg [° C.] | $T_d^5$ [° C.] | CTE [ppm/° C.] | Tensile Strength [MPa] | Young's Modulus [GPa] | Elongation at Break [%] | Dielectric Constant [1 MHz] | Transmittance [%] |
|---|---|---|---|---|---|---|---|---|
| 1 | 239.0 | 463.4 | 51.6 | 76.8 | 2.74 | 6.6 | 2.9 | 88.0 |
| 2 | 265.6 | 533.3 | 51.9 | 99.7 | 2.63 | 5.5 | 3.3 | 2.0 |
| 3 | 215.2 | 561.1 | 59.1 | 124.2 | 1.89 | 108.2 | 3.2 | 84.1 |

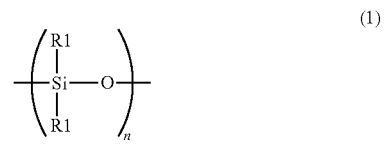

(1)

wherein R1 represents a hydrocarbon group having from 1 to 6 carbon atoms, and n indicates an integer of from 1 to 50;

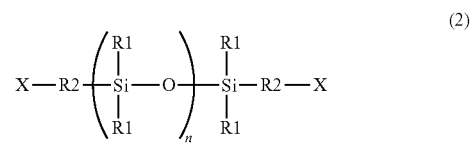

(2)

wherein R1 represents a hydrocarbon group having from 1 to 6 carbon atoms; R2 represents a divalent organic group; X represents an amino group, a carboxylic acid group, a halide carboxylate group or a carboxylic anhydride group; and n indicates an integer of from 1 to 50;

wherein said aromatic triamine is at least one of tris(3-aminophenyl)amine, tris(4-aminophenyl)amine, tris(3-aminophenyl)benzene, tris(4-aminophenyl) benzene, 1,3,5-tris(3-aminophenoxy)benzene, 1,3,5-tris(4-aminophenoxy)benzene (TAPOB) and 1,3,5-tris(4-aminophenoxy)triazine; and wherein said siloxane-modified hyperbranched polyimide has reactive end groups thereof in which at least one of

What is claimed is:

1. An insulation film for microelectronic materials comprising:

an insulating part having a film form comprising a siloxane-modified hyperbranched polyimide having a three-dimensional structure and having a siloxane structure represented by the following structural formula (1) in a molecule thereof;

wherein said siloxane-modified hyperbranched polyimide has a dendritic structure and is obtained through imidization of a siloxane-modified hyperbranched polyamic acid obtained by reacting an aromatic tetracarboxylic dianhydride, an aromatic triamine and a siloxane-containing compound represented by the following structural formula (2):

the reactive end groups is modified through a reaction with any of fluorine-containing compounds of monovalent amines, monovalent carboxylic acids, monovalent halide carboxylates or monovalent carboxylic anhydrides.

2. The insulation film for microelectronic materials according to claim 1, wherein the siloxane-containing compound is provided in such a molar ratio that a [—(R1)$_2$Si—O—] unit content of an intended siloxane-modified hyperbranched polyimide is in a range of 0.1 to 70 wt %.

3. The insulation film for microelectronic materials according to claim 1, wherein the fluorine-containing compound is at least one of heptafluorobutyric anhydride, 3.5-bistrifluoroaniline, m-trifluoromethylaniline, p-trifluoromethylaniline, and 1H,1H-heptadecafluoromethylamine.

* * * * *